2,938,856

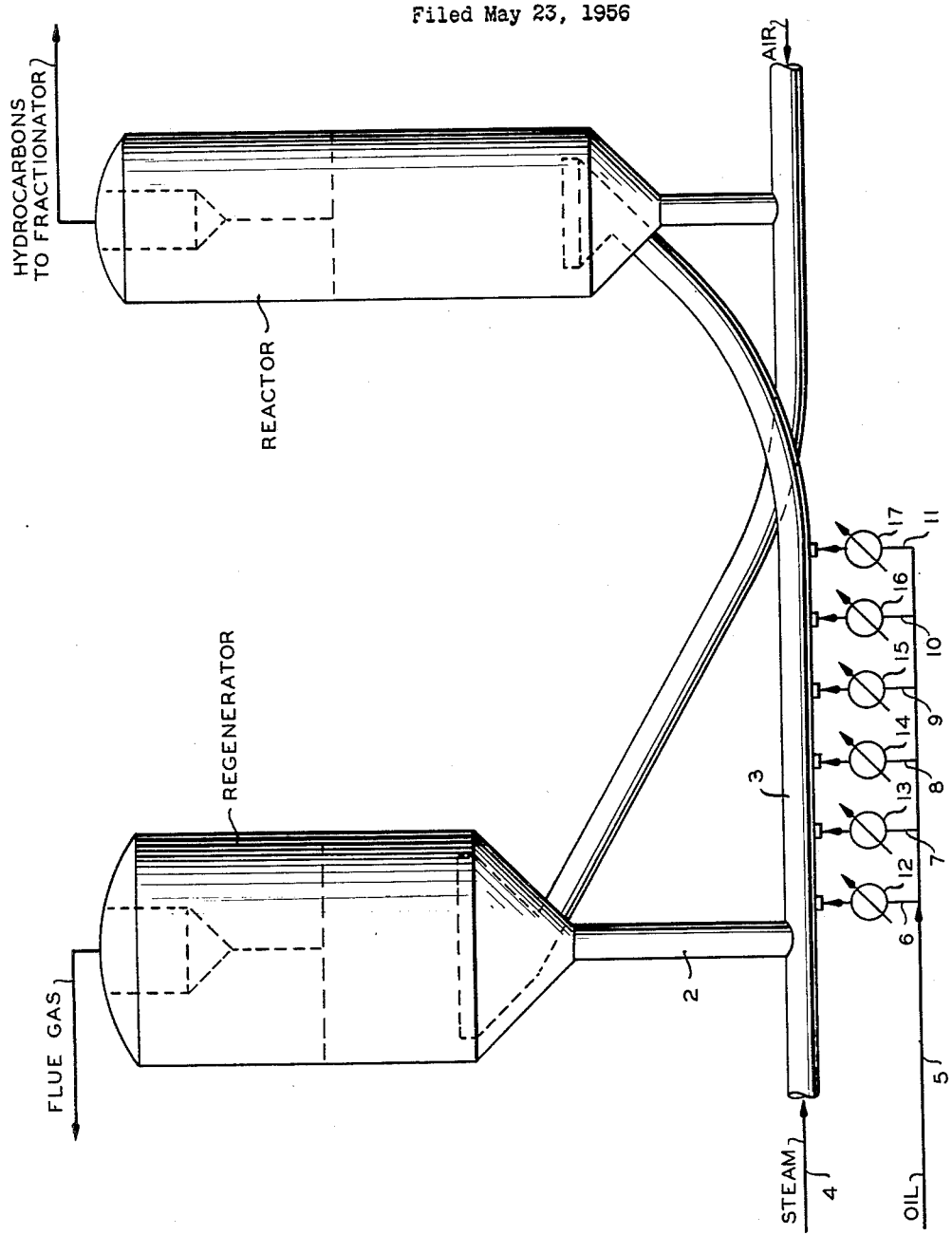

CATALYTIC CRACKING PROCESS

George R. Hettick, Borger, Tex., assignor to Phillips Petroleum Company, a corporation of Delaware Filed May 23, 1956, Ser. No. 586,812

4 Claims. (Cl. 208—74)

This invention relates to the catalytic cracking of a hydrocarbon in the presence of a catalyst. In one of its aspects, the invention relates to the catalytic cracking of hydrocarbon materials, such as hydrocarbon oil, in the presence of a catalyst employing substantially all of the steam and all of the catalyst admixed together and contacting therewith, successively, portions of the total amount of hydrocarbon to be converted in the presence of the catalyst.

I have now found that catalytically cracking an oil in the presence of increased amounts of steam over those amounts which have conventionally been used effects a more efficient operation in that there results a decreased carbon deposition upon the catalyst, an increase in valuable light olefin yield and an increase of the gasoline to carbon ratio. A somewhat decreased yield of gasoline which, however, has a higher octane value is obtained. This decrease, however, is more than offset when due consideration is given to the decreased carbon deposition which is obtained, the increase in the valuable light olefin yield and the increase of the gasoline to carbon ratio. Furthermore, the higher steam to catalyst and to oil ratios producing a lower carbon deposition on the catalyst results in a more active catalyst yielding a better product distribution. The term "product distribution," as one skilled in the art will understand, deals with the relative quantities of the various types of compounds which are obtained in the cracked stream.

The invention will now be described as it is embodied in a so-called fluid catalytic cracking operation wherein, as is known in the art, a finely divided particulate catalyst powder is suspended in a transport gas, such as steam, obtaining an admixture which flows somewhat as a fluid and with which there can be admixed a reactant to be converted, either by vaporizing the said reactant into a mixture of the hot catalyst and steam, or by simply admixing reactant in vapor form with the said hot catalyst and steam. It will be understood by those skilled in the art in possession of this disclosure that the concept of the invention is equally applicable to other forms of catalytic operations, for example, the well-known TCC operation. As is known in the TCC operation, a hydrocarbon oil vapor, or liquid, or a mixed phase feed is contacted with a downwardly moving bed of particulate catalytic material or contact mass. In any event, since the now preferred operation of the invention is in that embodiment in which a fluid catalytic cracking operation is effected, since it is with this type of operation that optimum results can most readily be obtained, the description of the invention with regard thereto should not be taken as a limitation upon the claims except as the claims may be limited to said operation.

According to my invention, there is provided a process for catalytically cracking a hydrocarbon in the presence of steam employed in a quantity of steam with respect to quantity of catalyst which is considerably higher than conventionally employed, wherein the total steam which will be employed and the total catalyst which will be employed are contacted with increments of the total amount of oil to be cracked, said contacting being accomplished at successive intervals of time. Thus, the entire body of catalyst, according to the invention, first contacts only a small part of the total feed which results in a high catalyst to feed or oil ratio. Since all of the steam has been admixed with the catalyst before the oil is contacted therewith, there will be a high ratio of steam to catalyst, as well as a high ratio of steam to oil existing at this initial contact. The contact time, according to the invention, will be very short and will be of the order of about 0.05 seconds. Then, still according to the invention, the next portion of oil will be added. Thus, five more portions of oil can be added, spaced about 0.05 second apart. The total time in the zone in which all of the oil is eventually increment-wise admixed with all of the steam and all of the catalyst will be about 1 second. Thus, in the fluid catalytic cracking operation in which it is conventional to admix the oil and catalyst, which has been fluidized, in a so-called "riser" the addition of increments of oil will be made in the riser and the total time of all of the oil, catalyst and steam in the riser will be about 1 second.

It will be understood by one skilled in the art in possession of this disclosure that the oil need not necessarily be added at equally spaced or even at equally timed points along the riser. Thus, if upon analysis it develops that optimum results require addition of variable quantities of oil at intervals to time which may differ each from any of the others, such addition can be practiced. However, for ease of explanation and as one embodiment of the invention, the invention is described in connection with a location of the feed inlets at 0.05 seconds intervals for 0.25 seconds, that is, there are six feed supply points. The total mixture then will travel another 0.75 seconds until it reaches a reactor wherein the total contact time will be about 10 seconds. The conversion reactions which are obtained in the reactor differ markedly from the initial type of cracking reaction which takes place in the riser as will be understood by one skilled in the art in possession of this disclosure.

It is obvious from a consideration of this disclosure that as additional increments of feed or oil are added to the mixture of steam and catalyst, the relative proportions of catalyst and/or steam to oil are reduced. When the last increment of oil has been added to be cracked in the presence of the total mixture, the proportion of steam to oil and the proportion of catalyst to oil will be approximately conventional. Thus, the first increment of feed oil is cracked at a very high steam to oil and very high catalyst to oil ratio. Finally, when the final increment of oil is cracked, it is cracked in the presence of the entire mixture of all of the steam and all of the catalyst and, therefore, substantially in the presence of a conventionally used amount of steam.

It has been observed that catalytically cracking an oil in the presence of 1000° F. catalyst or 1200° F. catalyst results in appreciably the same products. The higher the temperature of the catalyst, the greater will be its tendency to become deactivated. However, in mixing 700° F. feed oil with a 1200° F. catalyst, it should be noted that some of the oil is heated to a temperature approaching 1200° F. whereas a good portion of the oil will remain near the 700° F. level in view of the extremely short contact time in the riser. Thus, equilibrium conditions are not reached in the riser. These facts are to be taken into consideration when selecting the specific operating conditions with which to carry out the invention.

Also, in conventional practice, it is ordinarily believed that equilibrium conditions are reached in the reactor and that the reactor temperature is that of the mixture less the heat removed by the endothermic cracking reaction. However, in the riser at the original locus of catalyst-oil contact, equilibrium is not established.

Referring now to the drawing, in which there is shown schematically a hydrocarbon conversion unit involving a regenerator and a reactor, regenerated catalyst coming from a catalyst regenator is fed my way of conduit 2 into riser 3 wherein it is admixed with all of the steam and all of the oil which are introduced by way of conduits 4 and 5. However, it will be observed that whereas all of the steam and regenerated catalyst are at once admixed together at the juncture of pipes 2 and 3, the oil in pipe 5 is added increment-wise by way of pipes 6, 7, 8, 9, 10 and 11. At each point of addition, there can be provided a supplementary heater as shown at 12, 13, 14, 15, 16 and 17. The regenerator, the reactor, as well as values which would be provided upon each of lines 6 to 11, inclusive, are not shown for sake of simplicity. It will be understood that according to the invention, pipes 6–11 need not be equally spaed either with respect to distance or with respect to time, but can be so positioned as to obtain optimum injection of optimum quantities of oil at each point. However, as explained above, for purposes of this embodiment of the invention, the pipes 6–11, inclusive, have been evenly spaced as representing substantially even increments of time. Actually, with even spacing of pipes 6–11, inclusive, as more oil is introduced to riser 3, a greater volume must be handled and, therefore, there will be a speed-up of flow but, since there is a larger volume to pass any given point, the total time for all of the mixture to pass a given point will reamin substantially the same. When all of the oil has been added to riser 3, the total admixture continues on to the reaction vessel to be converted in conventional manner. In the reactor, cracking is completed and conversion to desirable products occurs as above described. From the reactor, converted hydrocarbons are taken off in conventional manner from the top and catalyst after a stripping operation is removed and returned to the regenerator by withdrawing it from the bottom of the reactor and conveying it into the regenerator.

EXAMPLE

In a six foot diameter riser, ending with a catalyst (silicia-alumina) to oil weight ratio of about 4 to 1, the total 1,600 barrels/hours of oil (gas oil API 26.7) is divided into 6 streams of 266 barrels/hours each. The oil is introduced at 700° F. Individual heaters are provided in each feed line to adjust the temperature of the oil. The entire amount of steam at 700° F. and at the rate of 24,000 pounds per hour is introduced along with the total catalyst prior to the incremental oil introductions. The first oil is cracked in the presence of about 90# steam per barrel of oil, the second at 45# steam per barrel of oil, etc., and finally the last of the feed is cracked in the presence of 15# steam per barrel of oil (or the conventional amount). This first step of total feed introduction occurs in about 0.25 seconds. The entire mass after the last feed injection flows in the riser for about 0.75 seconds until it enters the reactor where the equilibrium temperature of 900° F. is reached. The contact time herein is about 10 seconds. Substantially all of the cracking has occurred, however, in the riser in about 1.0 second time. The average # steam per barrel of oil is higher in my process than the 15# steam per barrel taken as conventional in the example, and the average conversion is on a catalyst with a lower coke content. Due to the decreasing activity and increasing coke on the catalyst, the amount of reaction after the final injection of feed is relatively small, as compared with the amount of reaction which occurs upstream of the final oil injection locus.

Tabulation

A. Processing by the invention:
- (a) Catalyst (2), at 1100° F., tons/hr. ___ 1,000
- (b) Oil (6 to 11), at 700° F., barrels/hr. __ 1,600
  - API @ 60/60 _____ 26.7
  - Increments 6 to 11, each, bbl./hr. ____ 266
- (c) Steam, at 700° F., pounds/hr. _____ 24,000
  - Steam to oil, #/bbl.—
    - at 6 injection point _____ 90
    - at 7 injection poin _____ 45
    - at 8 injection point _____ 30
    - at 9 injection point _____ 22.5
    - at 10 injection point _____ 18
    - at 11 injection point _____ 15
- (d) Catalyst to oil weight ratio:
  - at 7 injection point _____ 24
  - at 6 injection point _____ 12
  - at 8 injection point _____ 8
  - at 9 injection point _____ 6
  - at 10 injection point _____ 4.8
  - at 11 injection point _____ 4

NOTES (a) Catalysts which can be used include the natural catalysts such as the acid-treated clays such as bentonite (of which the principal ingredient is Montmorillonite), and the various synthetic catalysts (such as silica-alumina, silica-alumina-zirconia, etc.).

(b) Any suitable crackable oil may be employed, including virgin gas oils, vacuum gas oils, mixtures of virgin and cracked oils or recycle oils, etc. In the specific example, the oil charged (26.7 API gas oil) is divided into six equal increments of 266 barrels per hour each, 6 through 11 on the figure, and are adjusted in temperature by heaters 12 through 17, as required. These incremental oil feeds, in the specific example, are spaced apart by about 0.05 second time, about 0.25 second time elapsing between the initial oil and final oil injection points.

Comparison of results of operating by the invention (A, above) and by the conventional method wherein 1,000 tons per hour of the same catalyst are used (at 1100° F.), charging 1,600 bbls./hr. of the same 26.7 API gas oil feed at 700° F. at one feed point, and employing 24,000 pounds per hour of 700° F. steam in the charge oil. This conventional operation results in a catalyst to oil weight ratio of 4 to 1, and uses 15 pounds of steam per barrel of oil. The comparison is based on 75 percent conversion.

| Product | Invention | Conventional |
|---|---|---|
| Gasoline, Vol. Percent of Feed | 58.0 | 59.4 |
| Research O.N. W/2 ml. TEL | 96.8 | 95.7 |
| Gasoline/Carbon Weight Ratio | 21.2 to 1.0 | 20.4 to 1 |
| C₃ and C₄ Olefins, Vol. Percent of Feed | 14.6 | 13.1 |

Although there is a 1.4 volume percent decrease in catalytically cracked gasoline by the invention, there is, more importantly, an increase of octane of 1.1. Furthermore, the increase of olefins by the invention of 1.5 volume percent can be alkylated with isobutane to produce 2.5 volume percent of alkylate of 101.5 Research Octane Number w/2 ml. TEL. Hence, there is an overall gain in both volume and octane of gasoline produced by the invention.

Reasonable variation and modification are possible within the scope of the foregoing disclosure, drawing and the claims to the invention, the essence of which is that the reactant or oil in a catalytic conversion process is injected multipoint-wise to the catalyst in the presence of all of the steam or other fluid which will be employed to assist in the catalytic conversion to be practiced, more specifically, the invention being in the conversion of a hydrocarbon oil in a fluid catalytic cracking type operation wherein all of the steam and all of the catalyst are admixed together and then the hydrocarbon feed is contacted increment-wise with the said admixture, as set forth and described herein.

I claim:

1. A process of cracking a gas oil in a reaction zone in the presence of a catalyst consisting essentially of silica-alumina cracking catalyst which comprises admixing in a fluid transport admixing zone all of the catalyst and substantially all of the steam to be used in the conversion zone of the process in an approximate ratio of 1,000 tons catalyst per hour and 24,000 pounds steam per hour, under conversion conditions adding to said admixing zone increment-wise 1,600 barrels of said oil per hour to the admixture of steam and catalyst at spaced points along said admixing zone such that it takes the mixture in said admixing zone approximately 0.25 seconds to travel the distance between the first and the last of said spaced points, then maintaining the catalyst-steam-oil mixture thus obtained, as such, in said mixing zone, for approximately 0.75 seconds, then adding said mixture to said reaction zone containing a larger quantity of catalyst-steam-oil mixture earlier similarly obtained and now in said zone, maintaining the larger overall admixture thus obtained in said zone for an additional approximately 10 seconds, then operating catalyst from the converted oil products and recovering said oil products.

2. The catalytic conversion of a hydrocarbon in the presence of a catalyst and steam under conversion conditions which comprises admixing in a fluid transport admixing zone the catalyst and substantially all of the steam to be employed, under conversion conditions adding a portion of the hydrocarbon to be converted to the catalyst and steam admixture in said admixing zone, maintaining the catalyst-steam-oil admixture thus obtained which has a relatively high ratio of steam to catalyst and steam and catalyst to hydrocarbon under said conversion conditions for approximately 0.05 seconds conversion time to be applied to said portion of added hydrocarbon in said admixing zone, then adding another portion of hydrocarbon to the last-mentioned admixture still in said admixing zone obtaining a catalyst-steam-hydrocarbon admixture of relatively lower ratio of steam and catalyst oil, maintaining the last-mentioned admixture in said admixing zone under conversion conditions approximately an additional 0.05 seconds of the total conversion time to be applied to said hydrocarbon in said admixing zone and then passing the last-mentioned admixture to a reaction zone containing a larger quantity of catalyst-steam-hydrocarbon mixture earlier similarly obtained and now in said zone, maintaining the larger overall admixture thus obtained in said reaction zone for the remainder of said total conversion time, and separating catalyst from the converted hydrocarbon product effluent from said reaction zone and recovering said product.

3. A process according to claim 2 wherein at least three portions of hydrocarbon are added to the catalyst-steam mixture in said admixing zone, as described.

4. The catalytic conversion of a hydrocarbon in a conversion zone, in the presence of a conversion catalyst and steam under conversion conditions, which comprises first admixing in an admixing zone all of the steam and all of the catalyst to be employed in said conversion zone, then adding said hydrocarbon increment-wise to the admixture while it is still in the admixing zone at intervals of time of approximately 0.05 seconds until all of the oil has been added to said admixture and then passing the final admixture, thus obtained, to said conversion zone.

References Cited in the file of this patent
UNITED STATES PATENTS

| | | |
|---|---|---|
| 2,379,711 | Hemminger | July 3, 1945 |
| 2,407,374 | Kollenberg | Sept. 10, 1946 |
| 2,429,161 | Hudson | Oct. 14, 1947 |
| 2,432,277 | Brackenbury | Dec. 9, 1947 |
| 2,546,570 | Vance | Mar. 27, 1951 |
| 2,584,378 | Beam | Feb. 5, 1952 |
| 2,710,279 | Siecke | June 7, 1955 |

FOREIGN PATENTS

| | | |
|---|---|---|
| 701,231 | Great Britain | Dec. 23, 1953 |